United States Patent [19]
Hanley et al.

[11] Patent Number: 5,266,133
[45] Date of Patent: Nov. 30, 1993

[54] DRY EXPANSIBLE SEALANT AND BAFFLE COMPOSITION AND PRODUCT

[75] Inventors: John L. Hanley, Westland, Mich.; Roman C. Boos, Zurich, Switzerland

[73] Assignees: Sika Corporation, Southfield, Mich.; E. I. Du Pont de Nemours, Wilmington, Del.

[21] Appl. No.: 18,793

[22] Filed: Feb. 17, 1993

[51] Int. Cl.$^5$ .................. E04B 2/00; B32B 31/20
[52] U.S. Cl. ........................ 156/71; 156/79; 156/308.4; 521/84.1; 521/136; 521/139; 521/140
[58] Field of Search ............ 156/71, 79, 308.4; 521/84.1, 136, 139, 140

[56] References Cited

U.S. PATENT DOCUMENTS

| | | | |
|---|---|---|---|
| 3,264,272 | 8/1966 | Rees | 260/78.5 |
| 3,939,242 | 2/1976 | Lundberg et al. | 264/102 |
| 4,064,654 | 12/1977 | Olson | 49/489 |
| 4,127,547 | 11/1978 | Smarook | 521/98 |
| 4,164,512 | 8/1979 | Brenner et al. | 521/93 |
| 4,181,780 | 1/1980 | Brenner et al. | 521/93 |
| 4,186,163 | 1/1980 | Brenner et al. | 264/54 |
| 4,209,862 | 7/1980 | Cortes-Garza | 4/651 |
| 4,256,797 | 3/1981 | Stamper et al. | 428/215 |
| 4,391,384 | 7/1983 | Moore, III et al. | 220/359 |
| 4,758,601 | 7/1988 | Haas et al. | 521/108 |
| 4,810,440 | 3/1989 | Yoshida et al. | 264/53 |
| 4,830,798 | 5/1989 | Maeda | 264/50 |
| 5,124,186 | 6/1992 | Wycech | 428/35.8 |

FOREIGN PATENT DOCUMENTS 0383498 8/1990 European Pat. Off.

*Primary Examiner*—Morton Foelak
*Attorney, Agent, or Firm*—Hovey, Williams, Timmons & Collins

[57] ABSTRACT

A dry, initially non-tacky, expansible, shaped and formed sealant and baffle component is provided for sealing and providing an acoustic baffle for cavities in the hollow structural components of a vehicle body or the like, which during the manufacturing operation is conveyed through a bake oven at an elevated temperature. The component is made up of a metal ion neutralized ethylene-$\alpha,\beta$ ethylenically unsaturated carboxylic acid copolymer (ionomer), a blowing agent, and a tackifier, and optionally with an additive polymer and a cross-linking agent. The blowing agent is selected to be activated at the temperature of the bake oven so that the shaped and formed component expands in the body cavity to seal the cavity and prevent ingress of moisture, dust and other contaminating materials and particles, as well as to form a sound barrier therein.

10 Claims, No Drawings

DRY EXPANSIBLE SEALANT AND BAFFLE COMPOSITION AND PRODUCT

BACKGROUND OF THE INVENTION

1. Field of the Invention

This invention relates to a dry, initially non-tacky, heat expansible sealant and baffle composition which is formable into a desired shape so that upon insertion of a sealant product of predetermined shape into a cavity such as the hollow post structure of an automobile or similar vehicle, followed by heat induced expansion thereof, it serves as a highly effective sealant and acoustic baffle within that cavity.

In particular, the invention concerns a heat expansible sealant and baffle composition which after being formed into a desired configuration is adapted to be placed within a vehicle post or other body cavity in a position such that when the vehicle body is subjected to a primer and/or paint baking operation or other process which elevates the temperature of the environment surrounding the vehicle body, the shaped sealant and baffle product expands to an extent that the expanded component serves to attenuate annoying sounds that would otherwise pass through the cavity. The expanded product also functions to seal the cavity and thereby prevent infiltration of moisture, dust, air, other undesirable fluids, and sound.

2. Description of the Prior Art

During the fabrication of automobiles, trucks and similar over-the-road vehicles, many body components present cavities which require sealing to prevent ingress of moisture and contaminants which can cause corrosion of the body parts. This is especially true with respect to unibody structures in which a heavy frame is replaced with a structurally designed space frame that inherently presents a number of moisture and contaminant collecting cavities. These cavities also serve as passages which attenuate noise and other sounds transmitted therethrough during normal use of the vehicle. For example, the upright post structure of a vehicle's body defining a portion of a respective window opening presents an elongated passage or cavity which can collect moisture and contaminants and also transmit annoying sounds unless the passage or cavity is at least partially filled with a sealant material that blocks entrance of moisture and debris, and that also serves as a baffle for muting sounds that would otherwise be transmitted along the length of the passage or cavity. There are other irregular cavities in a vehicle body which desirably are sealed to prevent moisture and contaminants from entering that area and being conveyed to other parts of the interior of the vehicle body.

Many attempts have been made to seal these cavities, including spraying of a sealant into the cavity, introduction of foam products into such cavities, and use of fiberglass matting and the like. These past efforts have not been entirely satisfactory because of the inefficiency of the sealing and baffling methods, the relatively high cost of the sealing process, and the fact that erratic sealing has resulted in many instances.

Foaming in place has not been totally satisfactory because of the difficulty in controlling where the foam travels upon introduction of the foam into a vehicle body cavity or the like, and the fact that more foam than is actually needed is usually introduced into the body cavity to provide some degree of redundancy in preventing entry of moisture into the cavity during use of the vehicle. Furthermore, foams have a finite life insofar as flexibility is concerned before becoming rigid, thus limiting the time available during which the foam may be introduced into the vehicle cavity. In addition, if the interior surface of the cavity had a somewhat oily surface, the foams would not adequately adhere to that surface and provide an effective seal.

Other types of foam or foamable products are tacky in nature and thus cannot readily be positioned at the exact required disposition in the selected cavity. Certain sealant and baffling materials also are sensitive to the elevated temperature conditions to which a vehicle body may be subjected during fabrication of a vehicle thus causing disruption of the sealant and sound attenuating properties of the sealant.

SUMMARY OF THE INVENTION

It is therefore a primary object of the present invention to provide a dry, initially non-tacky, expansible sealant and baffle composition which expands when heated so that upon shaping and forming of the material into a component of predetermined configuration, that component may then be introduced into a vehicle body cavity or the like in disposition whereby upon elevation of the temperature of the environment surrounding the vehicle body, the component undergoes expansion to the extent that it serves as a sound attenuating barrier and seals the body cavity against infiltration of moisture and air thus preventing internal corrosion.

This principal object of the invention is accomplished by combining predetermined proportions of an ethylene-α, βethylenically unsaturated carboxylic acid, partially metallic ion neutralized ionomer, a heat activated blowing agent and a tackifier, and that may be formed into a dry, initially non-tacky, expansible sealant and baffle component of a predetermined size and shape. The outer surface of the component is not sticky or tacky when formed and shaped, but becomes tacky upon expansion as a result of elevation of the temperature of the product while positioned within a body cavity to be sealed. As a result, the expansible product adheres to the surface of the structure defining the cavity to be sealed during expansion and remains in place with full sealing being obtained.

A further significant object of the invention is to provide a dry, initially non-tacky, expansible sealant and baffle component for sealing and providing an acoustic baffle for a vehicle body cavity or the like which may be formulated from materials which expand to a required degree at an elevated temperature to which the vehicle body is subjected during at least a part of the manufacturing operation. The vehicles are generally subjected to a high temperature bake cycle, for example, within the range of about 150° C. to 250° C., and preferably about 160° C., in a bake/enamel oven following vehicle body shop work. After interior and exterior seam sealing, underbody coating and application of an exterior paint, the vehicle is directed through a low bake paint oven maintained at a temperature of 115° C. to about 150° C., and preferably about 120° C. Therefore, it is desirable that the expansible sealant and baffle component which is placed in a body cavity to be sealed, be responsive to the elevated temperature encountered in one or more of the baking ovens in order to undergo sufficient foaming to seal and provide an acoustic baffle for the vehicle cavity.

Another important object of the invention is the fact that the materials from which the expansible component is formed do not undergo significant deterioration during their normal life cycle under widely varying moisture and temperature climatic conditions.

Also an important object hereof is to provide a dry, initially non-tacky, expansible sealant and baffle component which is made up of cross-linked polymeric materials that allow selective variation of the degree of cross linking obtained so that the component may be designed to effectively seal any one of a number of structural cavities of differing cross-sectional area and shape, and to expand at a predetermined, specific temperature, within a relatively wide range of temperatures, that may occur in a manufacturing operation.

The invention also relates to a method of sealing and providing an acoustic baffle for a vehicle cavity or the like wherein a seal for such cavity may be obtained by the straightforward steps of simply combining an ionomer, a blowing agent and a tackifier, forming of such combination into a solid block, placing the block thus formed in the cavity to be sealed, and then subjecting the cavity defining structure to an elevated temperature sufficient to effect expansion thereof.

European Patent Application No. 0 383 498 by Exxon Chemical Patents Inc. describes a shaped foamable part which can be used in car pillars or the like that is based on a polymer containing units derived of ethylene and an olefinically unsaturated methyl acrylate (E-Ma). A cross linking agent and a blowing agent are combined with the E-Ma in order to effect foaming and curing of the product at a temperature within the range of 110° C. to 190° C. By virtue of the fact that the E-Ma has a broad molecular weight range, it is not possible to tailor the formulation so that it begins to foam at a particular temperature or relatively narrow temperature range. This means that control over foaming is difficult, if not impractical to obtain, because the different molecular weight fractions melt at different temperatures. When the part to be foamed in place is elevated to the bake oven temperature, that may not result in melting of all portions of the E-Ma, thus, limiting the degree of foaming, or causing non-homogenous and therefore unacceptable expansion and cell size.

By virtue of the utilization of ionomer base polymers which have ionic bonds, it is possible to tailor the sealant and baffle product so that it will undergo melting and consequent expansion at a fairly narrow temperature range. As a consequence, the base polymer uniformly melts at the selected temperature so that complete expansion and substantially uniform cell formation is obtained at the mandated oven bake temperature of the manufacturing process. Furthermore, the more uniform temperature melt profile obtained by use of ionomer type base polymer results in a greater cross linking density in the final expanded baffle and sealant product, not only because of the ionic bonds available along with co-valent bonds, but also because of the greater degree of melting that occurred at time of expansion.

DETAILED DESCRIPTION OF THE PREFERRED EMBODIMENTS

A preferred dry, initially non-tacky, expansible sealant and baffle component in accordance with the present invention is preferably formulated and prepared by first providing a quantity of base polymer. The base polymer, more fully described below, is an ethylene-$\alpha$-$\beta$ ethylenically unsaturated carboxylic acid copolymer ionomer composition which has been at least partially neutralized with a metallic ion such as zinc, sodium, potassium, lithium, magnesium, aluminum and strontium.

From about 30 to about 80 parts by weight of this base polymer ionomer is combined with from about 0.1 to about 10 parts by weight of a blowing agent, more fully described below, that is activated only after being subjected to predetermined elevated temperature. The blowing agent is selected to effect expansion of a product containing the ionomer, at a temperature to which the product is subjected during use thereof in a manufacturing process.

It is also desirable that a tackifier constituent more fully described below be added to the combination of the ionomer and blowing agent which imparts tackiness to at least the outer surface of a formed and shaped component prepared from the ionomer-blowing agent combination, only after the temperature of the component has been increased and after it may have undergone some degree of elevated temperature induced expansion. Prior to elevation of the temperature of the shaped component which has been formed from the ionomer-blowing agent combination, the component is dry, and the outer surface thereof is non-tacky. Best results have been obtained when the tackifier constituent causes the outer surface of a component prepared from the ionomer, blowing agent, and tackifier to become sticky and tacky and after the molded component is raised to a temperature sufficient to activate the blowing agent in the formulation. Preferably, from about 1 to about 10 parts by weight of a tackifier may be incorporated into the product formulation.

Other components, as discussed below, may be added.

When the dry, initially non-tacky, expansible sealant and baffle component is to be used for sealing body cavities of a vehicle or the like, it is preferred that the blowing agent initiate expansion of the formed and shaped component at a temperature within a range of from about 100° C. to about 200° C., and desirably from about 115° C. to about 200° C. An especially preferred formulation in this respect includes a blowing agent that is activated at temperature of about 120° C. to 160° C. A dry, initially non-tacky, expansible sealant and baffle formulation for preparing a formed and shaped expansible component especially useful in sealing vehicle body cavities or the like, and that will undergo expansion to a required degree when subjected to a predetermined elevated temperature during a manufacturing operation, may include:

Base Polymer

The base polymer is a copolymer of ethylene and an $\alpha,\beta$ ethylenically unsaturated carboxylic acid partially neutralized with a metallic ion. The base polymer is of the formulation E/X/Y, where E is ethylene, X is a carboxylic acid containing 3 to 8 carbon atoms, and Y is an optional alkyl acrylate, alkyl methacrylate, alkyl vinyl ether, carbon monoxide, sulfur dioxide, vinyl acetate, or mixtures thereof, where alkyl groups are 1-12 carbon atoms, and wherein— the acid groups in X are at least partially neutralized from 5-90%,
E is at least 50 weight % of E/X/Y,
X is 1-35 weight % of E/X/Y, and
Y is 0-49% weight % of E/X/Y.

Illustrative of the α,β-ethylenically unsaturated carboxylic acids useful in the preparation of said ionic copolymer are acrylic acid, methacrylic acid, ethacrylic acid, itaconic acid, maleic acid, fumaric acid, and monoesters of itaconic acid, maleic acid, and fumaric acid.

It is preferred that the metal be zinc, although useful results can be obtained using other metal cations such as sodium, potassium, lithium, magnesium, aluminum, and strontium in place of zinc. Procedures for preparing these ionomers are described in U.S. Pat. No. 3,264,272 which is incorporated herein by reference thereto.

An especially useful composition is an ionomer made up of metal ion partially neutralized ethylene-methacrylic acid copolymers.

Although the melt index, as measured per ASTM D-1238, is desirably from 0.2 to 14, the ionomer chosen for a particular application should have a melt index that will give a required degree of expansion of the shaped and formed component prepared therefrom.

Blowing Agent

From about 0.1 part to about 10 parts of an azodicarbonamide, or a benzene-sulfonyl hydrazide is the preferred blowing agent. The hydrazide may be a p,p'-oxybis(benzene-sulfonyl hydrazide), for example, Uniroyal Chemical Celogen ® TO, or p-toluene sulfonyl hydrazide sold by Uniroyal Chemical as Celogen ® TSH. The desired range of Celogen ® TO is preferably from about 2 parts by weight to about 8 parts by weight of the final product, while the range of Celogen ® TSH additive is from about 0.1% part to about 5% parts by weight and preferably from about 0.1% part to about 2% parts by weight of the total formulation.

Uniroyal Chemical Celogen ® AZ 130 or 3990 azodicarbonamides are suitable blowing agents, as are modified azodicarbonamides such as Uniroyal Chemical Celogen ® 754 or Celogen ® 765. The Celogen ® AZ blowing agents are preferably provided at a level from about 4 parts by weight to about 9 parts by weight of the final product.

The listed blowing agents are preferred because each serves to effect expansion of the sealant and baffle component at an elevated temperature level normally present during passage of the automobile body or other similar cavity defining structure through a bake oven. The temperature of the bake oven in vehicle manufacturing processes is generally of the order of 115° C. to about 200° C.

The preferred blowing agent is of a chemical nature as opposed to a physical blowing agent. The blowing agent may be made up of a combination of agents depending upon the degree of expansion desired for a particular application. Therefore, the choice of blowing agent is dependant upon the desired degree of expansion, the required cell structure, and the automobile or other manufacturers oven bake schedule.

Tackifiers

It is also preferred that a tackifier be incorporated in the formulation to be molded and shaped into the expansible sealant and baffle component. The tackifier constituent should be of a nature to cause the outer surface of the molded and shaped component to become sticky and tacky upon expansion of the component by the blowing agent, but not of characteristics such that the outer surface of the component exhibits tackiness or is sticky after molding and before expansion of the component. It is therefore desirable that the molded and shaped sealing and baffle component which is to be strategically placed in a cavity that is to be sealed and acoustically baffled, have a dry, initially non-tacky surface. However, the tackifier additive preferably has the property of causing the outer surface of the component to become tacky and sticky when the component is subjected to an elevated temperature sufficient to cause the blowing agent to effect expansion of the component to the preferred 100% to 1500% extent.

In order to enhance the adhesive properties of the base polymer (and any additive polymer included therewith) at the bake temperature to which the sealant and baffle product is subjected, the tackifier constituent desirably should have the following characteristics: a relatively low average number molecular weight, i.e. 3000 or less; no significant crystallinity; a ring and ball softening point of at least about 50° C and preferably higher than that value; and that is compatible with the base polymer and/or the additive polymer. Compatibility in this respect can be determined by preparing a blend at a temperature of about 350° F of the tackifier and base polymer/additive polymer formulation, pouring of the blend onto a support surface to form a relatively thin layer, and to then determine the flexibility of that sheet at room temperature. The materials should exhibit no cracking or stress whitening and flex freely without cracking when bent. To achieve compatibility, the acid functionality of the tackifier constituent can be adjusted.

From about 1 to about 10 parts by weight of the tackifier should be included in the formulation. Exemplary tackifiers in this respect include: alkyl phenol-formaldehyde novolak resin (Akrochem ® P-90); partially polymerized (dimerized) rosin (Hercules Polypale ® rosin); pentaerythritol ester of disproportioned tall oil rosin (Arizona Chemical Zonester ® 65 having a melting point of 65° C.); hydrogenated pentaerythritol ester rosin (Hercules Pentalyn ® H); low molecular weight, non-polar, aromatic (petroleum-derived monomers) thermoplastic resin (Hercules Picco ® 5000 and 6000 series aromatic hydrocarbon resins, in particularly the 5100 and 6100resins having a ring and ball temperature of 100° C.); glycerol ester of rosin (Hercules Vinsol ® Ester Gum); and octylphenol-formaldehyde phenolic resin (PMC Specialties Group, Inc. Dyphene ® 8313.)

Particularly useful tackifiers comprise α-methyl styrene polymers of the type available from Amoco and identified as Resin 18-XXX. The specific numbers substituted for "XXX" in the resin designations indicate the approximate softening point in degrees fahrenheit (ring and ball value) of the specific resin. For example, Resin 18-210 has a softening point of 210° F., Resin 18-240 has a softening point of 245° F., and Resin 18-290 has a softening point of 286° F. The viscosity of AmoCo Resin 18-210 on the Gardner-Holdt (40% toluene) scale is J-L, Resin 18-240 is U-V, and Resin 18-290 is Z-Z: The molecular weight (Mechrolab) of Resin 18-210 is 685, Resin 18-240 is 790 and Resin 18-290 is 960.

A number of tackifying resins having a wide variety of melting points are useful in the polymer composition of the present invention. For example, in the case of Hercules Picco ® 6100, the "100" in the designator indicates the ring and ball of the polymeric material. When this tackifier is blended with the preferred ethylene-α,β ethylenically unsaturated, carboxylic acid partially metal ion neutralized ionomer and an ethylene methacrylic acid or ethylene vinyl acetate additive polymer if present (both having a melting point of about 85° C.), a physical polymer matrix is formed. When the admixture is a solid, the thermoplastic characteristics are dominant. As the temperature of the material is increased to a level above about 100° C. (as for example, in a car manufacturer's paint/primer baking and/or curing oven), melting of the tackifier begins to occur. Thus, the liquid tackifying resin or polymer is able to wet out the metal substrates surrounding the expansible sealant and baffle product.

If desired, combinations of the listed tackifiers may be incorporated in the sealant and acoustic baffle formulation. In most instances, no more than about three of the tackifiers are used in the combination.

Optional Additive Polymers

Additive polymers may optionally be incorporated in the sealant and acoustic baffle formulation, with a cross-linking agent then being added to couple the additive with the ionomer base polymer. An additive polymer(s) is added to the sealant and baffle formulation to increase the melt index thereof, so long as the copolymer is compatible with the ionomer base polymer, and provided the cost of such additive polymer is within a practical range.

Each of the additive polymers preferably is of the formulation E/X/Y where E is ethylene, X is a carboxylic acid containing 3 to 8 carbon atoms, and Y is an alkyl acrylate, aklyl methacrylate, alkyl vinyl ether, carbon monoxide, sulfur dioxide, vinyl acetate or mixture thereof, where the alkyl groups are 1-12 carbon atoms, and wherein—

E is at least 50 weight % of E/X/Y,
X is 0-35 weight % of E/X/Y, and
Y is 0-45 weight % of E/X/Y.

The preferred additive polymers are chosen from the group consisting of ethylene methacrylic acid polymers, or ethylene vinyl acetate polymers. Two or more additive polymers may be present. Each additive polymer may be present in an amount of from about 1 part to about 20 parts by weight. Preferably about 10 parts to 20 parts by weight of an additive polymer of the composition ethylene/methacrylic acid, and about 1 part to 20 parts by weight of an additive polymer of the composition ethylene/vinyl acetate having a melt index of about 10 to about 500 per ASTM D-1238.

The additive polymer serves to increase the overall flexibility of the sealant and baffle component upon expansion thereof within a structural cavity, provide directional expansion control, imparts melt control as well as cell control, and increases cold impact resistance.

The quantity of additive polymer added is related to and dependant to a certain extent upon the proportion of an optional filler that may be added.

The preferred additive polymer is Nucrel ® 599 which has a melt index of 500 per ASTM D-1238. Nucrel ® 599 is a copolymer of 90 weight % ethylene and 10 weight % MAA based on total additive polymer (E/10%MAA).

When ethylene-vinyl acetate (EVA) is utilized as the additive polymer, the EVA chosen should have a melt index of from about 10 to about 500. Again, the quantity added (from about 1 part by weight to about 20 parts by weight) is largely a function of the amount of filler added to the formulation.

Styrene type rubbers may also be used as an additive polymer, as for example, styrene-butadiene-styrene block polymers, styrene-isoprene-styrene block polymers, and styrene-ethylene/butylene-styrene block polymers, or slightly cross-linked, styrene-butadiene type synthetic rubbers sold under the trade designation Ameripol Synpol SBR 1009. Preferably these styrene type rubbers would be added in an amount of about 1 part to about 10 parts and more preferably from about 2 parts to about 5 parts of the block polymers and in an amount of from about 1 part to about 10 parts and more preferably from about 1 part to about 4 parts of the SBR type rubber.

Cross-Linking Agent

A cross-linking agent is normally incorporated in the formulation in those instances where an additive polymer is added in order to further cross-link the polymers during the bake cycle, and to increase the degree of curing of the polymers. Any free radical initiator cross-linking agent that is compatible with the ionomer base polymer and the additive polymer may be utilized in the present formulation, although a peroxide based cross-linking agent is preferred. A,a'-bis(t-butylperoxy) diisopropylbenzenes (40%) on clay are the most preferred (e.g., Akrochem Retilox ® F 40 KEP) cross-linking agents, although Volkup ® 40 KE and peroxides such as dicumyl peroxide (Dicup ® 40 P) have also been found to be satisfactory. In most instances, from about 1 part to about 5 parts by weight of the peroxide cross-linking agent is provided in the sealant and acoustic baffle formulation.

Activators

Optionally, an activator may be included in the sealant and acoustic baffle formulation for the purpose of reducing the temperature of activation of the chemical blowing agent, or the combination of such agents. Specifically, an activator such as a surface coated, oil treated urea (Uniroyal Chemical BIK ® TO) may be added to the formulation with from about 1 part to about 5 parts by weight, and desirably from about 1 part to about 2 parts by weight of the BIK TO activator being provided in the sealant and acoustic baffle component.

Zinc oxide may also be incorporated in the formulation as an activator with the range of incorporation being from about 1 part to about 5 parts by weight and desirably from about 0.5 part to about 2 parts by weight of the ZnO being provided in the sealant and baffle formulation.

Other optional activators include from about 1 part to about 5 parts by weight of calcium and/or zinc stearate, or polyethylene glycol in the expansible sealant and baffle component.

The amount of activator for the blowing agent(s) which is added is depended upon the degree of expansion required of the sealant and baffle product. For example, a composition which is formulated to expand about 400% will require one type of activation system, while a composition formulated to expand 1,000% will have a different activation system, as is common knowledge to formulators of expandable materials.

Plasticizers

Another optional component in the formulation is a plasticizer to soften the polymer matrix and reduce the melting point of the ionomer(s). The plasticizer may be present in an amount from about 1 part to about 15 parts by weight in the sealant and acoustic baffle component. A preferred plasticizer is diisooctylphthalate (DIOP).

Other useful plasticizers include DNIP, DIDP and naphthenic oils. The amount of the plasticizer included is dependant upon the quantity of rubber co-polymer added, and the filler concentration.

Fillers

If desired, fillers may also be added to the sealant and acoustic baffle formulations. From about 1 part to about 20 parts by weight of calcium carbonate (Thomasville Regency #7) or barium sulfate (Cyprus #22 Barytes) may be included in the expansible sealant and baffle component.

Adhesion Promoters

Additives may be incorporated in the formulation to further improve adhesion of the expanded component to certain substrates. Exemplary adhesion promoters include the organosilanes, carboxylated resins, resins containing maleic anhydride, and similar materials. From about 1 part to about 5 parts by weight of the promoter is normally adequate.

Pigments

Pigments can be added to the formulation to meet a particular customers specifications. Generally, the amount of the pigment(s) will be within the range from about 1 part to about 5 parts by weight and may include carbon black, titanium dioxide, or other compatible colored pigments.

EXAMPLE 1

Preparation of a composition useful for preparing a sealant and baffle product having the desired characteristics of the present invention is preferably carried out by adding the ionomer material, the tackifying resin, and additive polymers and rubber type materials if used, to a clean high intensity mixer such as a Banbury-type mixer, or a high shear mixer such as a Baker/Perkins-type mixer. The constituents are mixed in the mixing vessel under high shear until a homogenous admixture is obtained.

Any fillers that are to be incorporated into the composition are then added to the mixer, along with adhesion promoters and any optional pigments. Again, the constituents are subjected to high shear while being mixed until a homogenous admixture is attained.

A coolant at a suitable temperature level should be directed into the coils or heat exchange surfaces of the mixer for a time period as may be required to assure that the temperature of the composition in the mixture does not exceed a level of about 95° C. and preferably no more than about 80° C., before blowing and curing agents are added to the mixer. If the blowing and curing agents were added at a temperature above the indicated maximum level, premature expansion and cross-linking could occur, thus, making the material unusable.

After it has been determined that the temperature of the composition in the mixture does not exceed the maximum 95° C. level, and desirably no more than about 80° C., the blowing agent(s), accelerator(s), cross-linking agent(s), and plasticizer(s) if used are added to the mixer and subjected to high intensity shear for 3 to 5 minutes.

The material is thereafter removed from the mixer and processed through a two-roll mill maintained at a temperature of about 55° C. to cool the admixture.

The resulting bulk composition is then subjected to a pelletizing operation, or extruded into sheet stock, rods or sticks, or a simple continuous form. The extruded material is then subjected to a pelletizing step. "Pelletizing" in this context means subjecting the bulk material out of the mixer, or the extruded shapes, to a process such as grinding, cutting, or any equivalent function which reduces the size of the composition into small pellets which can flow easily into an extruder or molder. The beads resulting from the pelletizing step normally will be about $\frac{1}{8}$ inch in diameter.

As a specific example of the invention, the following materials were admixed in a Banbury mixer for a time period sufficient to obtain a homogeneous product.

EXAMPLE 1

| Manufacture | Raw Material | % by Weight |
|---|---|---|
| DuPont | Surlyn ® 9970 | 54.0% |
| DuPont | Nucrel ® 599 | 10.0% |
| Ameripol | SBR 1009 | 2.0% |
| Hercules | Picco 6100 | 7.5% |
| Pfizer | Ultrapflex CaCO$_3$ | 12.0% |
| Ricon Resins | Ricon 156C | 3.0% |
| Uniroyal | Celogen AZ-130 | 4.9% |
| Uniroyal | Celogen OT | 2.1% |
| Akrochem | Zinc Oxide | 1.5% |
| Akrochem | Peroximon DC-40P | 3.0% |

The formulation of this example will expand about 400% when subjected to a temperature sufficient to activate the blowing agent therein.

EXAMPLE 2

Other suitable formulations include the following:

| Mfg. | Raw Material | Batch 1 | Batch 2 | Batch 3 | Batch 4 |
|---|---|---|---|---|---|
| DuPont | Surlyn ® 9450[1] | 64.00% | 64.00% | 64.00% | 64.00% |
| DuPont | Nucrel ® 010[2] | 16.00% | 16.00% | 16.00% | 16.00% |
| Arizona Chemical | Zonester 65 | 6.00% | 6.00% | 6.00% | 9.00% |
| Thomasville | Regency #7 CaCO$_3$ | 3.50% | 3.00% | 3.00% | ***** |
| Uniroyal | Celogen ® AZ-130 | 3.50% | 3.50% | ***** | 3.50% |
| Uniroyal | Celogen ® OT | 3.50% | 3.50% | 7.00% | 3.50% |
| Uniroyal | BIK OT | 0.25% | 0.50% | 0.50% | 0.50% |
|  | ZnO | 0.25% | 0.50% | 0.50% | 0.50% |
| Akrochem | Volkup 40 KE Peroxide | 3.00% | 3.00% | 3.00% | 3.00% |
|  |  | 100.00% | 100.00% | 100.00% | 100.00% |

[1] SURLYN ® 9450 is a co-polymer of 91 weight % ethylene and 9 weight % methacrylic acid based on total polymer (E/9% MAA), 18% neutralized with Zn.
[2] NUCREL ® 010 is a co-polymer of 80 weight % ethylene/10 weight % butyl acrylate/10 weight % methacrylic acid with a melt index of 10.

EXAMPLE 3

The following materials were admixed in a Banbury mixer for a time period sufficient to obtain a homogeneous product.

| Raw Material | | Formula 1 | Formula 2 | Formula 3 | Formula 4 | Formula 5 | Formula 6 | Formula 7 | Formula 8 | Formula 9 | Formula 10 |
|---|---|---|---|---|---|---|---|---|---|---|---|
| Surlyn ® 9450[3] | | 80.0% | 79.0% | 80.5% | 64.0% | 64.0% | 52.0% | | | | |
| Surlyn ® 9950[4] | | | | | | | | 64.0% | | | |
| Surlyn ® 9970[5] | | | | | 16.0% | | | | 64.0% | 64.0% | 60.0% |
| Nucrel ® 010[6] | | | | | | 16.0% | 28.0% | 16.0% | | | |
| Nucrel ® 599[7] | | | | | | | | | 16.0% | 16.0% | 15.0% |
| SBR 1009 | | | | | | | | | | | 5.0% |
| Tackifying resin | | 6.0% | 6.0% | 5.9% | 6.0% | 6.0% | 6.0% | 6.0% | 9.5% | 10.0% | 9.5% |
| Calcium Carbonate | | 3.0% | 3.0% | 4.4% | 3.5% | 3.5% | 3.5% | | | | |
| Kevlar ® Fiber/Talc | | | | | | | | 3.5% | | | |
| Celogen ® AZ | | 7.0% | 7.0% | 4.9% | 4.0% | 3.5% | 3.5% | | 4.9% | 4.9% | 4.9% |
| Celogen ® OT | | | | | 3.0% | 3.5% | 3.5% | 7.0% | 2.1% | 2.1% | 2.1% |
| Urea | | 1.0% | 1.0% | 0.7% | 0.3% | 0.3% | 0.3% | 0.3% | | 0.3% | |
| Zinc Oxide | | | 1.0% | 0.7% | 0.3% | 0.3% | 0.3% | 0.3% | 1.5% | 0.7% | 1.5% |
| Volkup ® 40 KE | | 3.0% | 3.0% | 2.9% | 3.0% | 3.0% | 3.0% | 3.0% | 1.5% | | |
| Dicup ® 40 P | | | | | | | | | 0.5% | 2.0% | 2.0% |
| Total | | 100.0% | 100.0% | 100.0% | 100.0% | 100.0% | 100.0% | 100.0% | 100.0% | 100.0% | 100.0% |
| Testing/Opinions Expansion | | | | | | | | | | | |
| Volume[8] 30 in. @ 325° F. | Mean | 422.2% | 934.7% | 587.0% | 222.1% | 275.8% | 270.4% | 293.0% | 353.7% | 344.0% | 440.2% |
| | St. Dev. | 13.2% | 100.1% | 44.7% | 19.4% | 59.3% | 26.2% | 53.5% | 43.5% | 21.7% | 38.6% |
| Vertical[9] | Mean | 242.4% | 493.7% | 798.2% | 140.8% | 210.1% | 156.2% | 214.0% | 299.6% | 273.2% | 341.9% |
| | St. Dev. | 31.8% | 40.2% | 100.5% | 9.8% | 11.0% | 16.9% | 21.2% | 16.2% | 17.3% | 13.4% |
| Volume[8] 30 in. @ 350° F. | Mean | NT | NT | NT | NT | NT | NT | NT | 700.4% | 663.0% | 591.1% |
| | St. Dev. | NT | NT | NT | NT | NT | NT | NT | 51.8% | 20.0% | 59.4% |
| Vertical[9] | Mean | NT | NT | NT | NT | NT | NT | NT | 447.7% | 367.9% | 394.4% |
| | St. Dev. | NT | NT | NT | NT | NT | NT | NT | 11.1% | 15.5% | 8.7% |
| Comments | | 1st Batch with metal adhesion. | | | | | | | Dual bakes for specific auto plant. | Dual bakes for specific auto plant. | Dual bakes for specific auto plant. |

[3] SURLYN ® 9450 is a co-polymer of 91 weight % ethylene and 9 weight % methacrylic acid based on total polymer (E/9% MAA), 18% neutralized with Zn. with a melt index of 5.
[4] SURLYN ® 9950 is E/15% MAA 23% neutralized with zinc with a melt index of 5.5.
[5] SURLYN ® 9970 is E/15% MAA 22% neturalized with zinc with a melt index of 14.
[6] NUCREL ® 010 is a co-polymer of 80 weight % ethylene/10 weight % butyl acrylate/10 weight % methacrylic acid with a melt index of 10.
[7] NUCREL ® 599 is a co-polymer of 90 weight % ethylene/10 weight % methacrylic acid with a melt index of 500.
[8] Tested according to General Motors Specification GM9037P
[9] Tested according to General Motors Specification GM9764P A selected formulation from the preceding examples may be molded into a desired shape dependant upon the volume of the cavity to be sealed and baffled, and the configuration of that cavity, to assure that the formed component will fully expand into sealing relationship to the structural sidewalls and thereby prevent ingress of moisture, dirt and other undesirable materials.

The amount of expansion the material should exhibit is normally specified by the OEM manufacturers material specifications. The specifications are written to take into consideration weight required for the part, the area that requires sealing, and stresses imposed by the material on the structure being sealed while expanding in the baffle area. For example, in the case of automobiles, the upright tubular pillars on one side of the vehicle making up the vertical windshield frame, the intermediate pillar between the front and rear side windows, and the rear pillar are conventionally referred to as the A, B and C pillars, respectively. A pillar is a support member between the outer skin of the vehicle and support structure on the inside of the vehicle. These pillars vary in size and shape from vehicle to vehicle. It is desirable though that a sealant and baffle composition be incorporated in the tubular interior of these pillars to exclude sound and moisture incursion. In the case of a composition formulated in accordance with Example 1 above, which has an expansion value of 400%, a 75 mm×75 mm pillar may be sealed to an extent of $5.0 \times 10^{-4}$ m$^3$ area using a formed component that weighs 140 grams.

The actual size and shape of a sealant and baffle component of this invention to be used in sealing structures such as an automobile pillar, or other similar structure is often dictated by the user for a particular application, depending upon the nature of the structure to be sealed and the amount of expansion of the product when heated that is specified by the OEM manufacturer. In this respect, if the expansible ionomer product of this invention is molded, such as by injection molding, very intricate parts can be made. This enables the sealant and baffle and product to be engineered to operate at a maximum performance with the least amount of material.

Various techniques may be employed to secure the expansible ionomer sealant and baffle product in a desired location within the structure to be sealed before raising of the temperature of the product to a level to effect expansion thereof. In certain instances, the structure to be sealed has structural parts which will support the component in a desired location, particularly if the sealant and baffle product has been molded to a predetermined shape for that application. Other attachment means may be employed such as fasteners forming a part of the structure to be sealed, or fastening agents incorporated into the molded sealant and baffle product.

Application areas for the sealant and baffle composition of this invention in the automotive industry include both the body shop where metal fabrication, welding and body shop sealers are applied, as well as the down the line paint shop where interior and exterior seam sealing and underbody coating are also carried out in conjunction with application of exterior coatings. The vehicles are generally subjected to a high bake temperature from 150° C. to about 200° C. in the E (enamel)-coat/primer oven immediately following the body shop operations, and to a low temperature of from about 115° C. to about 149° C. in the paint oven. The component is placed in the structural cavity of the body, prior to conveyance of the vehicle body through the bake oven.

One vehicle manufacturer uses a high bake/enamel cycle wherein the vehicle is subjected to a temperature of 157° C. for 25 minutes and a second 25 minute paint oven bake cycle at 115° C. Another manufacturer utilizes a high bake cycle of 20 minutes at 163° C. and a 30 minute low bake cycle at 121° C.

Thus, the constituents making up the expansible sealant and baffle product, and particularly the blowing agent are chosen to assure expansion of the component to a desired degree and to a required extent for sealing a particular cavity of the vehicle body, when the vehicle is conveyed through a particular baking oven at a selectively controlled high or low bake temperature.

It has been found that the ionomer sealant and baffle composition of this invention exhibits superior sound attenuation as compared with other plastic/rubber foam systems at a significantly lower specific gravity. A lighter product made up of less material may therefore be used at an equal or greater sound attenuation than is the case with materials such as conventional rubber and other thermoplastic materials. The ionomer sealant and baffle composition hereof also has been found to have improved initial adhesion characteristics as compared with adhesion of conventional rubber and thermoplastic materials to metals typically used in original automobile manufacturing. The corrosion prevention properties of the ionomer sealant and baffle composition of this invention have also been found to be better than those properties of conventional foam sealants when used with the same metals. Also, the water absorption properties of the present ionomer sealant and baffle composition are far superior to previously available rubber and thermoplastic foams used for sealing purposes.

An important feature of the invention is the fact that the outer surface of the expansible sealant and acoustic baffle component becomes tacky during heating thereof in the bake cycle, so that the component during expansion comes into engagement with the structural component to be sealed, thereby providing a moisture impervious barrier, as well as serving as an acoustic baffle upon final cooling of the baffle and sealant material. Furthermore, materials may be chosen which in combination cause the component to expand to a required extent in the preferred range of from about 100% to about 1500% greater than the original volume of the expansible sealant and baffle component.

We claim:

1. A method of sealing and providing an acoustic baffle for structure defining an area which is at least partially enclosed and that is subjected to a predetermined elevated temperature during a manufacturing operation, comprising the steps of:

combining — from about 30 to about 80 parts by weight of an ethylene-$\alpha,\beta$ ethylenically unsaturated carboxylic acid copolymer composition which has been at least partially neutralized with a metallic ion, and that has a melt index range of from about 0.2 to about 14, from about 0.1 to about 10 parts by weight of a heat activated blowing agent capable of increasing the volume of the composition, and a sufficient amount of a tackifier constituent to impart tackiness to at least the outer surface of the component when it is subjected to said elevated temperature;

forming and shaping the combination of said composition, the agent, and the constituent into a dry, initially solid, non-tacky component;

introducing said component into said area; and subjecting the component to said temperature, so that the component expands to an extent and the tackifier in association with the composition causes at least the outer surface of the component to become tacky and thereby adhesively bond to the surface of the structure defining said area, the expanded component sealing the area of the structure to present a baffle which substantially prevents infiltration of moisture and air and attenuates annoying sounds.

2. A method as set forth in claim 1, wherein said metallic ion is zinc, sodium, potassium, lithium, magnesium, aluminum, and strontium.

3. A method as set forth in claim 1, wherein is included the step of adding an ionomer composition made up of partially neutralized ethylene-methacrylic acid copolymer.

4. A method as set forth in claim 1, wherein is included the step of adding a blowing agent which is activated at a temperature within the range of about 100° C. to about 200° C.

5. A method as set forth in claim 1, wherein is included the step of adding a sufficient amount of said blowing agent is to cause an increase in the volume of the component when raised to said elevated temperature, of from about 100% to about 1500%.

6. A method as set forth in claim 1, wherein is included the step of adding from about 1 to about 10 parts by weight of an additive polymer to the combination of said composition, the blowing agent and said constituent.

7. A method as set forth in claim 1, wherein said additive polymer is selected from the group consisting of ethylene-methacrylic acid polymer, ethylene-vinyl acetate, and styrene-butadiene polymer cross linked with divinyl benzene.

8. A method as set forth in claim 6, wherein is included the step of adding from about 1 to about 5 parts by weight of a cross-linking agent to the combination of said composition, the blowing agent, the constituent and said additive polymer.

9. A method as set forth in claim 8, wherein said cross-linking agent is a free radical initiator.

10. A method as set forth in claim 1, wherein is included the step of adding a sufficient amount of said blowing agent to the combination of said composition, blowing agent and constituent to cause the component to increase in volume from about 100% to about 1500% when the component is subjected to said elevated temperature.

* * * * *